(12) United States Patent
Chang et al.

(10) Patent No.: US 12,032,635 B2
(45) Date of Patent: Jul. 9, 2024

(54) SYSTEMS, APPARATUSES, AND METHODS OF PROCESSING AND MANAGING WEB TRAFFIC DATA

(71) Applicant: COUPANG CORP., Seoul (KR)

(72) Inventors: Peiqiang Chang, Bellevue, WA (US); Yan Tan, Redmond, WA (US); Joong Hoon Kim, Seoul (KR); Byung Hyun Ahn, Seoul (KR); Tae Min Park, Seoul (KR)

(73) Assignee: Coupang Corp., Seoul (KR)

( * ) Notice: Subject to any disclaimer, the term of this patent is extended or adjusted under 35 U.S.C. 154(b) by 347 days.

(21) Appl. No.: 16/914,757

(22) Filed: Jun. 29, 2020

(65) Prior Publication Data
US 2020/0349206 A1    Nov. 5, 2020

Related U.S. Application Data

(63) Continuation of application No. 16/379,761, filed on Apr. 9, 2019, now Pat. No. 10,769,220.

(51) Int. Cl.
| | | |
|---|---|---|
| *G06F 16/951* | (2019.01) | |
| *G06F 11/07* | (2006.01) | |
| *G06F 16/908* | (2019.01) | |
| *G06F 16/955* | (2019.01) | |

(52) U.S. Cl.
CPC ........ *G06F 16/951* (2019.01); *G06F 11/0775* (2013.01); *G06F 16/908* (2019.01); *G06F 16/955* (2019.01)

(58) Field of Classification Search
CPC .... G06F 16/951; G06F 16/955; G06F 16/908; G06F 11/0775
See application file for complete search history.

(56) References Cited

U.S. PATENT DOCUMENTS

| | | | |
|---|---|---|---|
| 7,180,887 B1 | 2/2007 | Schwaderer et al. | |
| 7,636,717 B1 | 12/2009 | Gupta et al. | |
| 8,149,715 B1 * | 4/2012 | Goel | H04W 40/248 370/255 |

(Continued)

FOREIGN PATENT DOCUMENTS

| | | |
|---|---|---|
| CN | 102460441 A | 5/2012 |
| CN | 102713834 A | 10/2012 |

(Continued)

OTHER PUBLICATIONS

Notice of Preliminary Rejection in counterpart Korean Patent Application No. 10-2022-0024446 dated Mar. 19, 2022 (5 pages).

(Continued)

*Primary Examiner* — Jay A Morrison
(74) *Attorney, Agent, or Firm* — FINNEGAN, HENDERSON, FARABOW, GARRETT & DUNNER LLP

(57) ABSTRACT

Methods, apparatuses, and systems for collecting and validating web traffic data, including receiving preprocessed log data representing an activity of a device interacting with a data service; validating the preprocessed log data in accordance with a predetermined format, the format comprising a field indicative of a predetermined data type and a field indicative of a predetermined validation condition associated with the predetermined data type; and generating metadata associated with validated preprocessed log data.

13 Claims, 8 Drawing Sheets

(56) References Cited

U.S. PATENT DOCUMENTS

| | | |
|---|---|---|
| 8,930,330 B1 | 1/2015 | Arguelles et al. |
| 9,367,813 B2 | 6/2016 | Jung et al. |
| 2001/0032181 A1 | 10/2001 | Jakstadt et al. |
| 2003/0069758 A1 | 4/2003 | Anderson et al. |
| 2006/0173672 A1 | 8/2006 | Bergeron et al. |
| 2010/0318858 A1 | 12/2010 | Essawi et al. |
| 2011/0153667 A1 | 6/2011 | Parmenter et al. |
| 2011/0321012 A1 | 12/2011 | Samantaray et al. |
| 2013/0103749 A1 | 4/2013 | Werth et al. |
| 2013/0110758 A1 | 5/2013 | Jung et al. |
| 2013/0191920 A1 | 7/2013 | Amit et al. |
| 2014/0280197 A1 | 9/2014 | Gatto et al. |
| 2015/0222666 A1 | 8/2015 | Kumar et al. |
| 2015/0244617 A1 | 8/2015 | Nakil et al. |
| 2015/0263047 A1 | 9/2015 | Kimura et al. |
| 2015/0263947 A1 | 9/2015 | Ortacdag et al. |
| 2016/0117703 A1 | 4/2016 | Woddi et al. |
| 2019/0130440 A1 | 5/2019 | Qiu et al. |
| 2019/0146967 A1* | 5/2019 | Beedgen ............... G06F 16/24 707/703 |

FOREIGN PATENT DOCUMENTS

| | | |
|---|---|---|
| KR | 10-2009-0090755 | 8/2009 |
| KR | 10-2015-0000590 | 1/2015 |
| KR | 10-2015-0000590 A | 1/2015 |
| TW | 200821877 | 5/2008 |
| TW | 201324432 A1 | 6/2013 |
| TW | 11510108 B | 11/2015 |
| TW | 11523475 B | 2/2016 |
| TW | 201733304 A | 9/2017 |
| WO | WO 2005/055093 | 6/2005 |
| WO | WO 2005/055093 A2 | 6/2005 |
| WO | WO 2018/025140 | 2/2018 |
| WO | WO 2018/025140 A1 | 2/2018 |
| WO | WO 2018/156796 | 8/2018 |
| WO | WO 2018/156796 A1 | 8/2018 |

OTHER PUBLICATIONS

Office Action in counterpart Japanese Patent Application No. 2020-537727 dated Mar. 28, 2022 (6 pages).

International Search Report and Written Opinion dated Oct. 21, 2021, in counterpart PCT International Application No. PCT/IB2020/053045, 8 pages.

Office Action dated Oct. 5, 2021, from the Japanese Patent Office in counterpart Japanese Application No. 2020-537727, 7 pages.

Office Action dated Oct. 1, 2021, from the Taiwanese Patent Office in counterpart Taiwanese Application No. 110115996, 16 pages.

Examination Report No. 1 dated Nov. 26, 2020, from the Australian Patent Office in counterpart Australian Application No. 2020264292, 4 pages.

Notice of Allowance dated Feb. 4, 2021, from the Taiwanese Patent Office in counterpart Taiwanese Application No. 109111829, 2 pages.

Notice of Preliminary Rejection dated Apr. 19, 2021, from the Korean Patent Office in counterpart Korean Application No. 10-2019-0069486, 10 pages.

Examination Notice dated Jun. 1, 2021, from the Hong Kong Patent Office in counterpart Hong Kong Application No. 22020005339.9, 13 pages.

Vietnamese Office Action in counterpart application 1-2021-02811 dated Dec. 3, 2021 (2 pages).

Indian Office Action in counterpart application 202047049659 dated Dec. 10, 2021 (6 pages).

Search Report dated Sep. 17, 2020, from the Taiwan Intellectual Patent Office related to Taiwan Application No. 109111829, 1 page.

International Search Report and Written Opinion dated Jul. 3, 2020, in PCT Application No. PCT/IB2020/053045, 11 pages.

Further Examination Notice in counterpart Hong Kong Patent Application No. 22020005339.9 dated Nov. 22, 2022 (15 pages).

The First Office Action in Chinese Patent Application No. 2019109652893 dated Mar. 9, 2023 (12 pages).

The Second Office Action in Chinese Patent Application No. 201910965289.3 dated Sep. 1, 2023 (19 pages).

Further Examination Notice in Hong Kong Patent Application No. 22020005339.9 dated Apr. 16, 2024 (10 pages).

* cited by examiner

200

| Define New Fields | | | | | | | |
|---|---|---|---|---|---|---|---|
| Fn | Name | DataType | Platform | Req | Abst | Validation | Comments |
| 🗑 | productId | integer | 🤖 🍎 🌐 📱 | ☑ | ☐ | none | productid |
| 🗑 | itemId | integer | 🤖 🍎 🌐 📱 | ☑ | ☐ | none | item id |
| 🗑 | vendoritemId | integer | 🤖 🍎 🌐 📱 | ☑ | ☐ | none | vendoritem id |
| 🗑 | sdpVisitKey | string | 🤖 🍎 🌐 📱 | ☐ | ☐ | oneOf [a,b,c,d] | sdp visit key |
| 🗑 | price | integer | 🤖 🍎 🌐 📱 | ☑ | ☐ | none | price |
| 🗑 | isLoser | boolean | 🤖 🍎 🌐 📱 | ☑ | ☐ | constant [1] | is loser |
| 🗑 | q | string | 🤖 🍎 🌐 📱 | ☐ | ☐ | none | search key words |
| 🗑 | searchId | string | 🤖 🍎 🌐 📱 | ☐ | ☐ | none | search id |
| 🗑 | rank | integer | 🤖 🍎 🌐 📱 | ☐ | ☐ | none | rank in list page |

*FIG. 2*

SYSTEMS, APPARATUSES, AND METHODS OF PROCESSING AND MANAGING WEB TRAFFIC DATA

CROSS-REFERENCE TO RELATED APPLICATIONS

This application is a continuation of and claims the benefit of priority to U.S. application Ser. No. 16/379,761, filed Apr. 9, 2019 (now allowed), the contents of which are hereby incorporated herein by reference.

TECHNICAL FIELD

The present disclosure generally relates to processing and managing web traffic data. In particular, embodiments of the present disclosure relate to inventive and unconventional systems for near-realtime processing and managing web traffic data of a data service in a multi-user environment.

BACKGROUND

Data science has been widely used to extract insights from a large volume of data generated from customer behavior to drive business decisions. For example, in electronic commerce ("e-commerce"), merchants use data science to analyze online activities of customers to predict customer behavior and preferences, which enables them to strategize procurement, sales, inventory, transportation, delivery, and other aspects in business processes. One of the major sources of the online activities of the customers is web traffic data, such as log data of an individual visiting a web data service (e.g., a website or a mobile application) using a device (e.g., a computer or a smartphone). In many situations, the web traffic data may be collected as a string of characters (e.g., a uniform resource identifier or "URI") that records useful information representing a customer interacting with the data service. Analysts may use the collected web traffic data to perform an analysis.

Some existing solutions for web traffic data collection and analysis are not adaptable to different formats of log data. For those solutions, an uninformed change of log data format may cause inaccuracy in downstream analysis. Moreover, those solutions are not customizable enough to collect various types and structures of log data. Analysts may require different format and contents of the log data, or need to disregard or no longer use some format or contents of the log data. However, those existing solutions lack such capability, which may cause duplicate information in the same log data. Furthermore, those solutions might not be able to validate the correctness of the log data, such as a required format or required data type. When the log data is corrupted, those solutions might not be able to detect and inform the log data analysts.

Therefore, there is a need for dynamic, customizable, and near-realtime collection and validation of web traffic data.

SUMMARY

One aspect of the present disclosure is directed to a system for collecting and validating web traffic data. The system includes a memory storing instructions, and at least one processor configured to execute the instructions to: receive preprocessed log data representing an activity of a device interacting with a data service; validate the preprocessed log data in accordance with a predetermined format, the format comprising a field indicative of a predetermined data type and a field indicative of a predetermined validation condition associated with the predetermined data type; and generate metadata associated with the validated preprocessed log data.

Another aspect of the present disclosure is directed to a computer-implemented method for collecting and validating web traffic data. The computer-implemented method includes: preprocessing the log data by parsing the log data and determining whether the parsed log data is in a predetermined data format; based on a determination that the parsed log data is in the predetermined data format, validating the preprocessed log data in accordance with a predetermined format; and based on a determination that the parsed log data is not in the predetermined data format, generating alert data for indicating a preprocessing error.

Yet another aspect of the present disclosure is directed to a system for collecting and validating web traffic data. The system includes a memory storing instructions, and at least one processor configured to execute the instructions to: in response to receiving format configuration data for creating a validation format, create the validation format associated with an indicator indicative of a first status, the validation format comprising a field indicative of a predetermined data type and a field indicative of a predetermined validation condition associated with the predetermined data type; in response to identifying the first status, validate test log data in accordance with the validation format in a test environment; based on a determination that no error is identified in validating the test log data, update the indicator to indicate a second status; receive log data representing an activity of a device interacting with a data service in a production environment; preprocess the log data by parsing the log data and determining whether the parsed log data is in the validation format; based on a determination that the parsed log data is not in the validation format, generate alert data for indicating a preprocessing error; based on a determination that the parsed log data is in the validation format, validate the preprocessed log data in accordance with the validation format in response to identifying the second status; and generate metadata associated with validated preprocessed log data, the metadata comprising at least one of an identifier of the validated preprocessed log data or a time indicative of generating the metadata.

Other systems, methods, and computer-readable media are also discussed herein.

BRIEF DESCRIPTION OF THE DRAWINGS

FIG. 2 is an example diagram of a user interface for configuring a log format provided by the system of FIG. 1, consistent with the disclosed embodiments.

DETAILED DESCRIPTION

Figure 1:
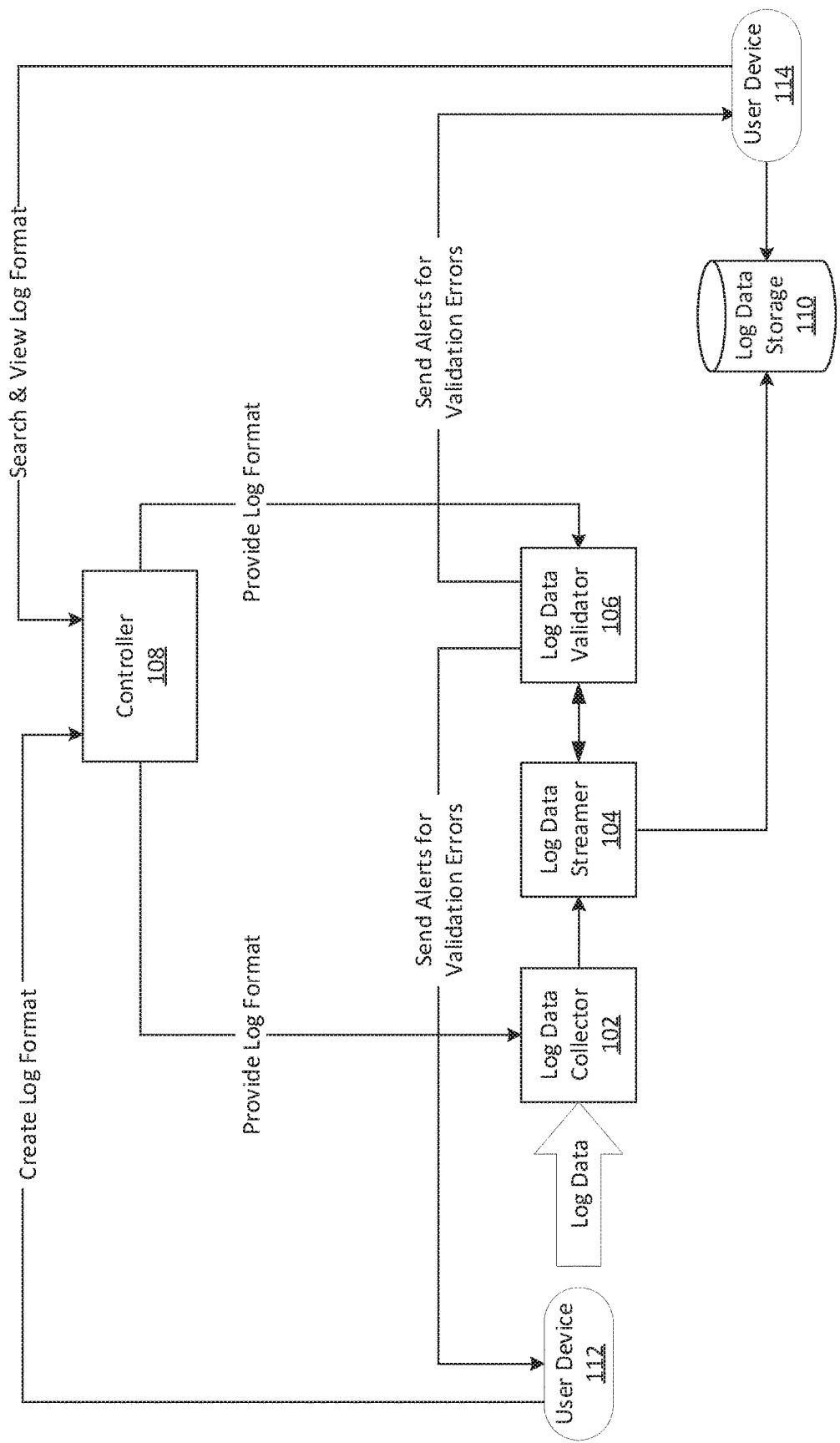
FIG. 1 is a schematic diagram illustrating an example embodiment of a system for collecting and validating web traffic data, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other embodiments are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems, apparatuses, and methods configured for collecting, validating, and routing web traffic data. According to embodiments disclosed herein, a system may provide near-realtime (e.g., average latency is about 1 second) web traffic data collection, validation, and routing in a multi-user environment. By using different user devices communicated with the system, engineers, product owners, business analysts, or data scientists of a data service provider may collect and analyze the web traffic data. The web traffic data may be collected in a customized format and structure, and then validated before being used for analysis. The validation may ensure the accuracy of the data and meeting dynamic and customized needs.

According to embodiments disclosed herein, the system may enable a user (e.g., an analyst) to generate and update various formats (or referred to "schemas") for collecting and validating the web traffic data (e.g., log data). In some embodiments, such formats may be stored in the system (e.g., metadata storage) for retrieving in accordance to different user needs. In some embodiments, the system may further provide a user interface (e.g., a webpage) for the user to generate or update the formats. When the user inputs or updates one or more parameters in the user interface, the system may automatically convert those parameters into specific program codes representing the formats. The program codes may be stored in the system (e.g., the metadata storage). In some embodiments, the system may further provide a searching feature for a user to seek, inquire, or filter a specific format. In some embodiments, the system may further provide a subscription feature for user devices to subscribe to a format created by another user device in communication with the system, thus synchronizing the knowledge of the format used between different users to assist analysis cooperation.

In some embodiments, the system may further provide a test environment and a production environment. The test and production environments may have similar configurations of computer hardware and software. However, the test environment may be used to develop and test new formats, and the production environment may be used for actual collection, processing, validation, and routing of the web traffic data.

In some embodiments, the system may further provide a warning feature that may generate a warning and send it to the user device when errors happen during the operation of the system, such as when the validation fails. In some embodiments, the system may further provide a report feature that may generate a report of metrics regarding log data usage and send it to user devices of a group of users.

Referring to FIG. 1, a schematic diagram illustrating an example embodiment of a system for collecting and validating web traffic data is shown. As illustrated in FIG. 1, system 100 may include a variety of systems, each of which may be connected to one another via one or more networks. The systems may also be connected to one another via a direct connection, for example, using a wired network or a wireless network. The depicted systems include log data collector 102, log data streamer 104, log data validator 106, controller 108, and log data storage 110. Any of log data collector 102, log data streamer 104, log data validator 106, controller 108, and log data storage 110 may be implemented as a computing apparatus, a software module running on one or more computing apparatus, or an emulated computing apparatus (e.g., a virtual machine). The emulated computer apparatus may include any combination of hardware (e.g., processors, memories, storage devices) and software (e.g., an operating system integrating the hardware), which may provide the functionality of a physical computer. In some embodiments, system 100 may host the subsystems in a virtual private cloud (VPC).

In some embodiments, any combination of components 102-110 of system 100 may be implemented as separate computers or a computer cluster. In some embodiments, any combination of components 102-110 may be implemented as software modules running on a computer or a computer cluster. In some embodiments, any combination of components 102-110 may be implemented as emulated computing apparatuses. In some embodiments, components 102-110 may be implemented as any combination of any number of computers, software modules, and emulated computing apparatuses. In some embodiments, components 102-110 may be implemented as distributed computer systems that include interconnected computers distributed in different geographic areas.

In some embodiments, log data collector 102 may be implemented as a computer system that receives log data representing an activity of a device (e.g., a computer or a mobile device) interacting with (e.g., visiting) a data service (e.g., a website or a mobile application server). Log data collector 102 may include multiple computer systems that may receive log data independently. For example, the log data may represent a purchase activity through an application on a mobile device (e.g., a smartphone or a tablet computer) of an individual interacting with a mobile application server. For another example, the log data may represent a browsing activity through a browser on a computer of an individual interacting with a website. In some embodiments, the log data may be a URI that records information that depicts the activity, such as an IP address, a device identifier (e.g., a MAC address or an IMEI number), a version number of the mobile application or the browser, a name of the mobile application or the browser, a language of the mobile application or the browser, a name of an operating system of the mobile device or the computer, a version number of the operating system, a time of the operating system, a location of the individual, an identifier of a viewed page (e.g., a product page), an identifier of a viewed item (e.g., a product), an identifier of a vendor of the viewed item (e.g., a name of a merchant), a price of the viewed item, a search term input by the individual, a rank of a page in the search results, a time duration for the customer to view the page or item, or any other useful information useful for predicting customer behavior.

In some embodiments, log data collector 102 may receive the log data via an HTTP protocol. In some embodiments, a user device (e.g., user device 112) of system 100 may provide a software development kit (SDK) for inputting log data into log data collector 102. In some embodiments, the user device may be a desktop computer, a laptop computer, a mobile device, a workstation, or any computing device that may provide an interface to input or output information from users (e.g., data analysts or developers) of system 100. The SDK may provide an interface to deserialize, validate, or measure incoming external log data (e.g., from a website or a mobile application server) to be received by internal computing devices of log data collector 102. In some embodiments, the SDK may provide an interface to use specifications (e.g., the log format) provided by controller 108 to deserialize, validate, or measure the incoming external log data.

In some embodiments, log data streamer 104 may be implemented as a computer system that manages data streams of system 100. Log data streamer 104 may forward log data received by log data collector 102 to log data validator 106 and receive and forward validated log data to log data storage 110. For example, log data streamer 104 may use a routing table to maintain IP addresses of destination servers for sending and receiving log data. In some embodiments, log data streamer 104 may also serve as a data buffer, which may equalize the input/output (I/O) rate of data in system 100. For example, during peak hours, web traffic may be heavy, and log data input may be a burst. Log data streamer 104 may control and balance the I/O rate of system 100 for balance performance.

In some embodiments, log data validator 106 may be implemented as a computer system that receives log data from log data streamer 104 and validates the log data in accordance with a log format provided by controller 108. If the log data is validated, log data validator 106 may send the validated log data back to log data streamer 104. Otherwise, log data validator 106 may send an alert representing a validation error to user devices of system 100, such as user device 112 and user device 114. In some embodiments, log data validator may be capable of processing a large volume of data in concurrency.

In some embodiments, controller 108 may be implemented as a computer system that receives and stores created or updated log format, and provides the log format for log data collector 102 and log data validator 106. In some embodiments, the log format may be a format including data types and permitted contents for each data type of the log data, which may be requested by users of system 100 for a specific purpose. For example, user device 114 may be used by a data analyst that analyzes customer behavior of individuals interacting with an e-commerce website. User device 114 may be used by the data analyst who wants to preclude log data generated by non-humans (e.g., by a web crawler computer program or by a hacker software). The data analyst may use user device 114 to define data types and permitted contents for each data type for the log data such that those data types and permitted contents are highly likely to be generated by a real human being. For example, the data analyst may use user device 114 to input requirements that the log data must include a name and a version of a browser. User device 114 may provide an interface to search, view, and select a log format from log formats stored in controller 108 that may satisfy the needs for the analysis. The log data format may be created by users of system 100, such as by using user device 112. user device 112 may provide an interface to create and send a log format to controller 108, which may store it for later use.

In some embodiments, the log format may be implemented as a notation format, such as a JavaScript object notation (JSON) format. The format may include or define one or more data fields. A data field may designate a data type and permitted content in the data type. For example, the data type may be a character string type, an integer type, a real number type, a Boolean type, or any computer-readable data type. The one or more data fields may include different data types. The permitted content may be set in accordance with analysis demands, and may be unlimited or limited to predetermined selections. For example, if the data type is a character string type, the permitted content may not allow non-displayable characters. For another example, if the data type is an integer type or a real number type, the permitted content may be limited to a range of numbers. In some embodiments, the permitted content of the data type in the log format may be used to configure a validation condition associated with the data type, which may be used by log data collector 102 and log data validator 106. In some embodiments, the log format may include mandatory data fields and optional data fields. The mandatory data fields may represent data fields that are designated as required for validation of log data by a user creating the log format. The optional data fields may represent data fields that are designated as optional by the user creating the log format. The mandatory data fields may be required for a specific analysis of the log data. The optional data fields may not be required but can be useful for the specific analysis of the log data.

In some embodiments, log data collector 102 may receive the log format from controller 108 and use it to screen received log data. For example, if the log format is JSON, when receiving the log data, log data collector 102 may parse the log data to determine whether it is in the JSON format. If the parsed log data conforms with the JSON format, the parsed log data may be accepted and forwarded to log data streamer 104. Otherwise, the parsed log data may be discarded. In some embodiments, if the parsed data conforms with the JSON format, log data collector 102 may further perform a preliminary validation before accepting the parsed log data. Log data collector 102 may detect whether some data fields of the parsed log data meet preliminary validation conditions. For example, log data collector 102 may determine whether the parsed log data include a data field representing an IP address, and if so, whether the content of that data field includes data representing a valid IP address (e.g., an IPv4 address). If so, the parsed log data may be accepted. Otherwise, the parsed log data may be discarded. The IP address validation condition may be used to differentiate whether the web traffic is from a human being or a hacker software, for example. If the web traffic is from hacker software, it might be that the parsed log data does not include a field representing IP address, or the field does not contain contents representing a valid IP address. By performing the preliminary validation, log data collector 102 may screen the target log data needed by analysts. In some embodiments, the process of the preliminary validation may be standardized as a transfer protocol, and by requiring incoming communications of log data collector 102 to comply with the transfer protocol, the preliminary validation may be performed. In some embodiments, after discarding the unaccepted parsed log data, log data collector 102 may send an alert indicating a parsing error to a user device of system 100.

In some embodiments, log data validator 106 may receive the log format from controller 108 and use it to validate the parsed log data received from log data streamer 104. For example, the parsed log data may include different fields of data, such as a browser name, a browser version, a device ID, a language locale setting, or log data may represent a browsing activity. Log data validator 106 may use the log format to determine whether the parsed data has a data portion required by the log format. For example, if the log format requires a field indicating a type of an operation system, and the parsed log data does not include any data portion representing any type of any operating system, then the parsed log data is not validated. If the parsed data has all data portions required by the log format, log data validator 106 may further determine whether contents of the data portions all meet the validation conditions associated with the respective data type of the log format. For example, if the parsed log data includes a data portion representing a type of an operation system, and the validation condition is that the type of the operating system must be either Android® or iOS®, then the parsed log data is not validated if the data portion includes content representing a Windows® operating system type. For another example, if the parsed log data includes a data portion representing a credit card number, and the validation condition is that the type of the credit card number must be integers, then the parsed log data is not validated if the data portion includes alphabetical characters. The use of the validation condition may enable analysts of log data to select a specific type of data. In the previous example, an analyst may be interested only in customers using mobile devices, and not interested in any customer using computers, then the analyst may create a log format that includes the validation condition requiring the type of the operating system indicated by the field of the log format to be either Android® or iOS® to serve the purpose.

In some embodiments, log data storage 110 may be implemented as a computer system that receives and stores validated log data from log data streamer 104. In some embodiments, log data storage 110 may include one or more subsystems that use different storage architectures, such as a file storage subsystem, an object storage subsystem, or a block storage subsystem. In some embodiments, log data storage 110 may include one or more databases or data warehouses. When analyzing the log data, the log data may be retrievable from log data storage 110 for user devices.

In some embodiments, system 100 may provide a user interface for users of system 100 to create, update, search, view, or select log formats. The user interface may be implemented as a web-based configuration page. The user devices may visit the configuration page and display it as a web page for a user. For example, user device 112 may display the configuration page for a user of system 100 to define specifics of a log format, and controller 108 may generate computer-readable notation codes representing the format using the inputs received from user device 112.

FIG. 2 is an example diagram of a user interface 200 for configuring a log format provided by system 100, consistent with the disclosed embodiments. As an example, user interface 200 in FIG. 2 is used for receiving log configuration data for creating a new log format. User interface 200 may also be used for updating an existing log format. In some embodiments, the new log format may be created based on another log format (referred to as a "parent log format"). For example, the user may search for a parent log format, update it, then save it as the new format. The parent log format may be a template log format.

In FIG. 2, user interface 200 may be implemented as a web-based configuration page. In some embodiments, the configuration page may be displayed by a user device (e.g., user device 112 or user device 114), and inputs received from the user device via user interface 200 may be sent to controller 108 for generating or updating log formats. Each row of user interface 200 represents a data field in the log format. Parameters of the log configuration data may be input for each row. The column "Name" shows a place for a user to define a name for the data field. The column "DataType" shows a place for a user to select from a list a data type associated with the data field, such as integer, string, or Boolean. The column "platform" shows a place for a user to designate on which operating system of a device this data field will be applied to. The column "Req" shows a place for a user to select whether the data field is mandatory or optional in the log format. For example, if the checkbox of this column is checked, the data field is mandatory. Otherwise, the data field is optional. The column "Abst" shows a place for a user to designate the data field as a template. The column "Validation" shows a place for a user to define the validation condition. The top selection list in this column may be used to limit the scope of the content of the data field. For example, "none" may be used to configure that any kind of content may be accepted for validating the corresponding data field. For another example, "constant" may be used to configure the only value that may be accepted for validating the corresponding data field. For another example, "one of" may be used to configure that only contents selected from a predetermined value list may be accepted for validating the corresponding data field. The bottom insert box of this column may be used to designate permitted contents for the data field. If the top selection list is selected as "none," the bottom insert box may be left blank. If the top selection list is selected as "one of," the bottom insert box may be used to input the predetermined value list, such as the "a, b, c, d" in the fourth row. The column "Comments" show a place for the user to insert a brief explanation or any information related to the data field.

In some embodiments, when the user input all desired parameters into user interface 200, the user may save the newly created log format, and the system 100 may generate a notation format file (e.g., a JSON file) using the input parameters. In some embodiments, the user may open an existing log format in user interface 200, and change any value of any parameter then update the log format. In some embodiments, the user may delete an existing log format in user interface 200.

Figure 3:
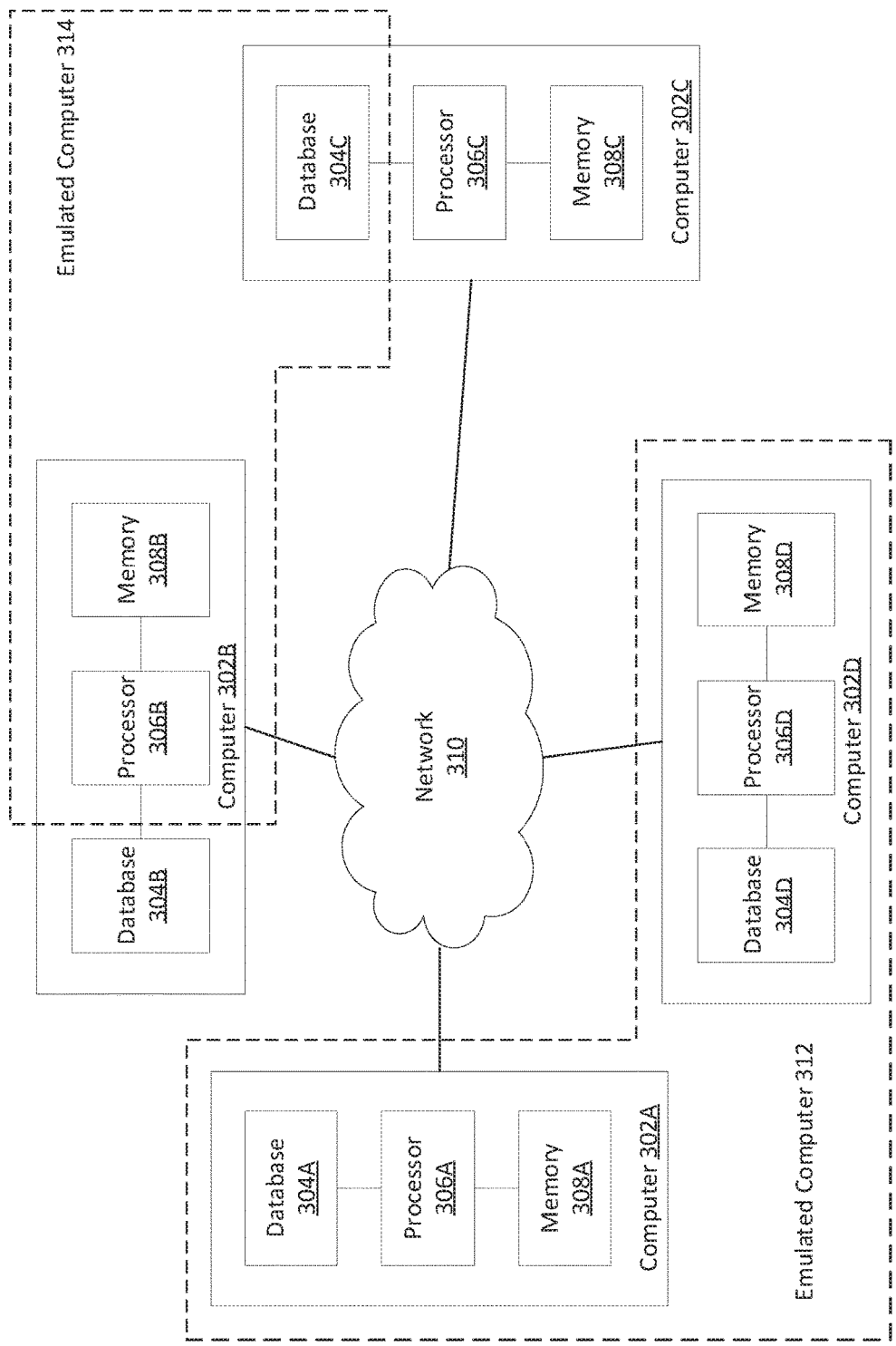
FIG. 3 is a diagrammatic illustration of example computing apparatuses used in the system of FIG. 1, consistent with the disclosed embodiments.

FIG. 3 is a diagrammatic illustration of example computing apparatuses used in the system of FIG. 1, consistent with the disclosed embodiments. FIG. 3 shows four computers 302A-302D coupled to network 310. It should be understood that any number of computers similar to computers 302A-302D may be included in system 100. FIG. 3 also illustrated two emulated computers 312-314. Emulated computers 312-314 may be virtual machines. Emulated computer 312 includes a combination of computers 302A and 302D and provide the functionality of a physical computer. Emulated computer 314 includes a combination of components of computers 302B and 302C, i.e., processor 306B, memory 308B, and database 304C, and provide the functionality of a physical computer. Components of emulated computers 312-314 may couple to each other via network 310. In some embodiments, components of emulated computers 312-314 may be dynamically changed, such as adding, removing, replacing, or adjusting capability of included components. For example, emulated computer 314 may be dynamically adjusted to include processor 306C to increase processing capabilities. For another example, emulated computer 312 may be dynamically adjusted to remove database 304A for providing extra storage space for other computers in system 100.

In some embodiments, log data collector 102, log data streamer 104, log data validator 106, controller 108, and log data storage 110 may be implemented as any combination of any number of: software modules running on computers 302A-302D or emulated computers 312-314; dedicated hardware apparatuses such as computers 302A-302D; or dedicated emulated apparatuses such as emulated computers 312-314. Computers 302A-302D may include databases 304A-304D, respectively. For ease of explanation without causing ambiguity, computer 302A is used as an example to describe the configuration of computers 302A-302D, unless expressly stated otherwise.

Computer 302A includes database 304A, processor 306A, and memory 308A. Memory 308A may store instructions that may be executed by processor 306A to implement processes or procedures for collecting and validating web traffic data. Database 304A may be implemented as any form of a collection of structured data stored in one or more local or remote computers or a distributed computer system and accessible to other computers.

Processor 306A may be a generic or specific electronic device capable of manipulating or processing information. For example, processor 306A may include any combination of any number of a central processing unit (or "CPU"), a graphics processing unit (or "GPU"), an optical processor, a programmable logic controllers, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), and any type of circuit capable of data processing. The processor 306A may also be a virtual processor that includes one or more processors distributed across multiple machines or devices coupled via a network (e.g., network 310).

Memory 308A may be a generic or specific electronic device capable of storing codes and data accessible by processor 306A (e.g., via a bus, not shown). For example, memory 308A may include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or any type of storage device. The codes may include an operating system (OS) and one or more application programs (or "apps") for specific tasks. Memory 308A may also be a virtual memory that includes one or more memories distributed across multiple machines or devices coupled via a network (e.g., network 310).

Network 310 may be one or more public or private communication network. For example, network 310 may include any combination of any number of the Internet, an Intranet, a Local-Area Network (LAN), a Wide-Area Network (WAN), a Metropolitan-Area Network (MAN), a virtual private network (VPN), a wireless network (e.g., compliant with the IEEE 802.11a/b/g/n), a wired network, a leased line, a cellular data network, and a network using Bluetooth connections, infrared connections, or Near-Field Communication (NFC) connections.

Methods, apparatuses, and systems of route planning for package pickup and delivery implemented according to this disclosure will be described in detail in connection to FIGS. 4-8 as follows. In FIGS. 4-8, processes 400, 500, 600, 700, and 800 may be implemented as software modules running on computers or emulated computers, such as computers 302A-302D or emulated computers 312-314. The software modules may include program codes or instructions stored in a computer-readable storage medium. The program codes or instructions may be read and executed by a processor to implement the aforementioned processes. For example, the computer-readable storage medium may be any of memories 308A-308D, and the processor may be any of processors 306A-306D. In some embodiments, the aforementioned processes may be implemented as separate computing apparatuses, such as computers 302A-302D. In some embodiments, the aforementioned processes may be implemented as separate emulated computing apparatuses, such as emulated computers 312-314. In some embodiments, the aforementioned processes may be implemented as a combination of the above-mentioned software modules, computing apparatuses, and emulated computing apparatuses.

Figure 4:
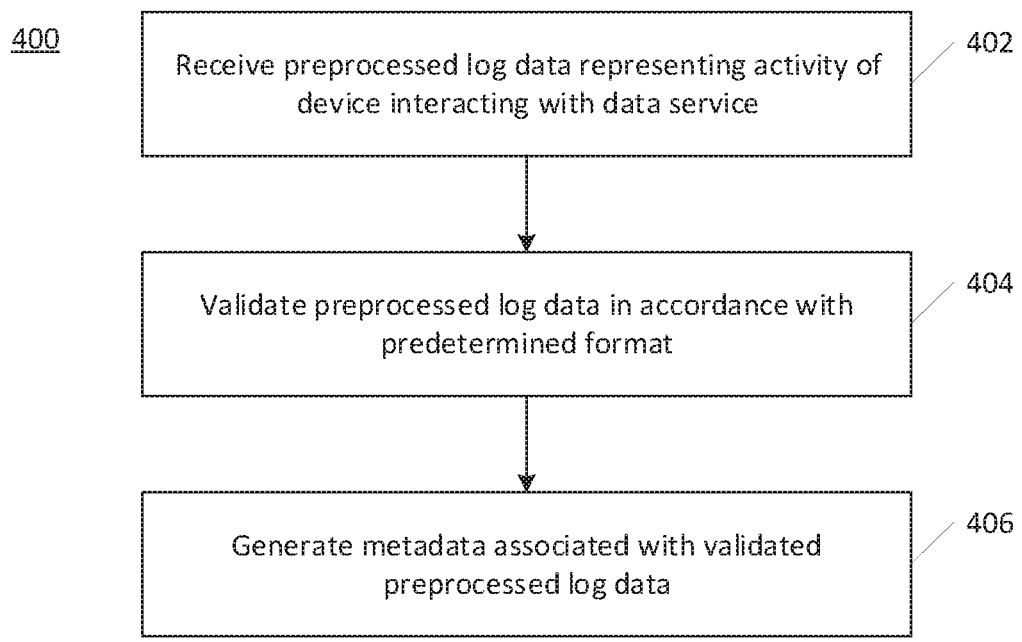
FIG. 4 is a flowchart of an example process for collecting and validating web traffic data, consistent with the disclosed embodiments.

FIG. 4 is a flowchart of an example process 400 for collecting and validating web traffic data, consistent with the disclosed embodiments. Process 400 may be performed by at least one processor, such as any combination of processors 306A-306D. In some embodiments, at least one processor of log data validator 106 may perform process 400.

At step 402, the at least one processor receives preprocessed log data representing an activity of a device interacting with a data service. In some embodiments, the data service may include at least one of a website or a mobile application server. In some embodiments, the log data may be a uniform resource identifier ("URI") of the data service. In some embodiments, the activity may include an activity of an individual interacting with the data service using the device.

In some embodiments, prior to step 402, log data collector 102 may preprocess the log data in the following operations. The at least one processor may preprocess the log data by parsing the log data and determining whether the parsed log data is in a predetermined data format. In some embodiments, the at least one processor may take the log data as input and split it into portions or pieces of data for further manipulation. In some embodiments, the predetermined data format may structure log data as a key-value (or attribute-value) pair. In some embodiments, the predetermined data format may be in JSON format. If the parsed log data is in the predetermined data format, the at least one processor may validate the preprocessed log data in accordance with the predetermined format. Otherwise, the at least one processor may generate alert data for indicating a preprocessing error. In some embodiments, log data collector 102 may send the alert data to generate an alert indicating the preprocessing error to user devices (e.g., user device 112 or user device 114 in FIG. 1) of system 100.

At step 404, the at least one processor validates the preprocessed log data in accordance with a predetermined format. The predetermined format may be the log format as described in the specification associated with FIG. 1. In some embodiments, the format may include a first field indicative of a predetermined data type and a second field indicative of a predetermined validation condition associated with the predetermined data type. In some embodiments, the first field and the second field may be stored in a notation format as a key-value (or attribute-value) pair. In some embodiments, the predetermined format may be a JSON format.

In some embodiments, the predetermined data type may include any combination of any number of a character string type, an integer type, a real number type, or a Boolean type. In some embodiments, the predetermined validation condition may include any combination of any number of: the data portion having no non-character value when the data portion is of the character string type, the data portion having no non-integer value when the data portion is of the integer type, the data portion having no non-numeric value when the data portion is of the real number type, or the data portion having no non-Boolean value when the data portion is of the Boolean type. In some embodiments, the predetermined validation condition may be associated with an activity of an individual interacting with the data service using the device.

In some embodiments, the predetermined format may include at least one of a mandatory field or an optional field. The mandatory data fields may represent data fields that are designated as required for validation of log data. The optional data fields may represent data fields that are designated as optional for validation of log data. A predetermined validation condition associated with the mandatory field may require the preprocessed log data to include a data portion of a type indicated by the mandatory field. A predetermined validation condition associated with the optional field does not require the preprocessed log data to include a data portion of a type indicated by the optional field.

Referring back to FIG. 4, at step 406, the at least one processor generates metadata associated with the validated preprocessed log data. In some embodiments, the metadata may include at least one of an identifier of the validated preprocessed log data or a time indicative of generating the metadata. In some embodiments, the metadata may further include at least one of an IP address of the device used by the user to interact with the data service, a user-agent data of a browser, or information of referring source of the interaction (e.g., visiting the data service). In some embodiments, such metadata may be determined from an HTTP header of the URI.

In some embodiments, after the metadata is generated, the at least one processor (e.g., at least one processor of log data streamer 104) may send the metadata and the validated log data to a destination storage device, such as log data storage 110. In some embodiments, the at least one processor may determine whether a network address (e.g. an IP address) of the storage device exists in accordance with a routing rule (e.g., by checking a routing policy). In some embodiments, the routing policy may include a routing table. In some embodiments, the routing table may categorize types of log data, and each type of log data may be associated with different network addresses of the storage device. If the network address exists, the at least one processor may send the metadata and the validated log data to the network address. Otherwise, the at least one processor may generate alert data indicating a routing error. In some embodiments, the at least one processor may send the alert data to generate an alert indicating the routing error to user devices (e.g., user device 112 or user device 114 in FIG. 1) of system 100.

Figure 5:
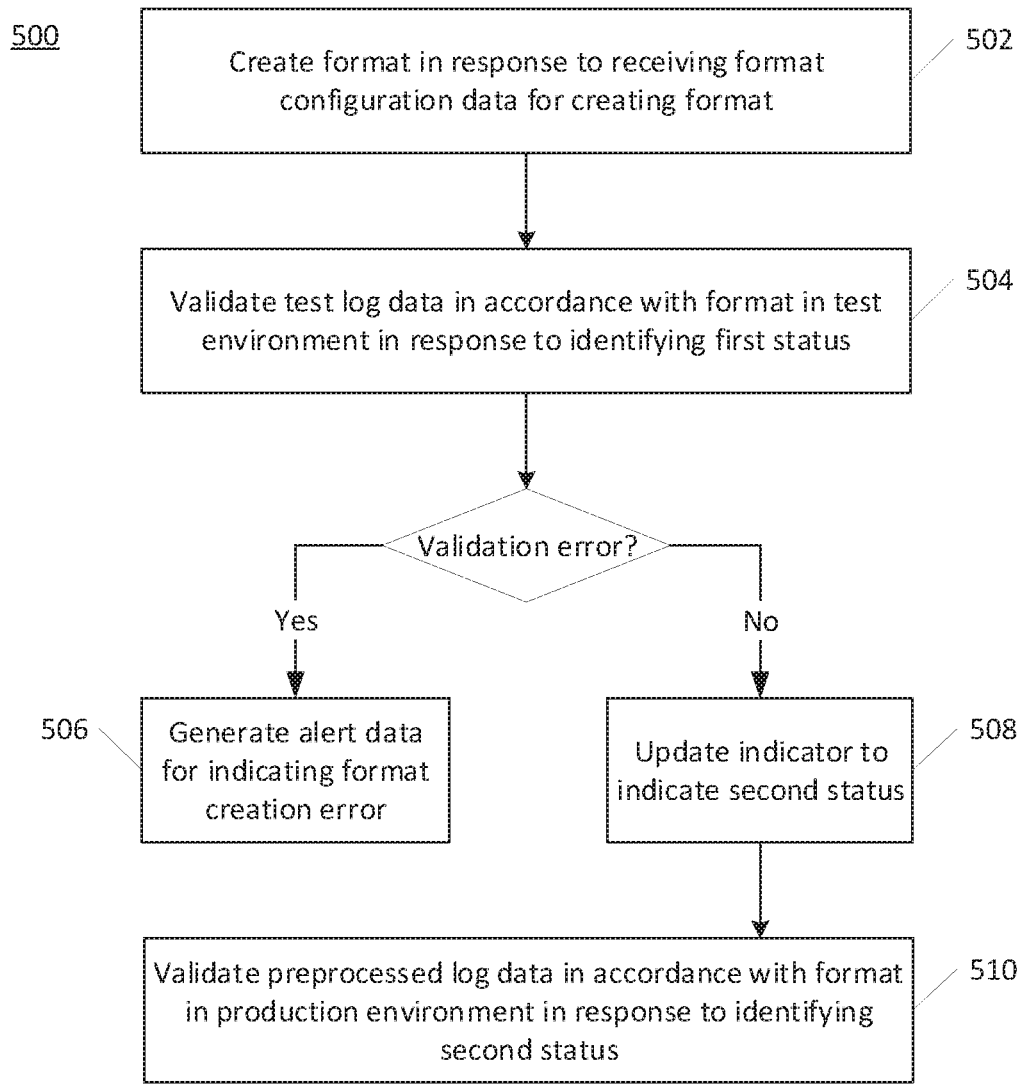
FIG. 5 is a flowchart of an example process for creating a log format, consistent with the disclosed embodiments.

In some embodiments, the at least one processor may be further configured to create the predetermined format. FIG. 5 is a flowchart of an example process 500 for creating the predetermined format, consistent with the disclosed embodiments. Process 500 may be implemented by the at least one processor in process 400, such as any combination of processors 306A-306D. In some embodiments, at least one processor of controller 108 may perform process 500.

At step 502, the at least one processor creates a format in response to receiving format configuration data for creating the format. In some embodiments, the format may be associated with an indicator indicative of a first status. In some embodiments, the format may be the log format as described in the specification associated with FIG. 1. In some embodiments, the format configuration data may be generated based on parameters input by analysts of the log data. For example, the parameters may be input using user interface 200 as shown in FIG. 2. In some embodiments, the indicator may be a field in the format, such as a flag or a parameter. In some embodiments, the first status may be set as a status representing that the format is not ready to be used in a production environment. In some embodiments, the first status may include one of: a draft status indicative of a newly created format, a review status indicative of the created format being under review, or an obsolete status indicative of the format being ineffective.

In some embodiments, the format configuration data may be generated from format configuration requirements received from a user device input by a user (e.g., a data analyst) of system 100. For example, if the user wants to focus on online purchasing behavior analysis, the user may use a user device (e.g., user device 114) to input format configuration requirements of only accepting web traffic data coming from an interaction between a mobile device and a mobile application server. In the format configuration requirements, the user may specify data types, data fields, and constraints on the data types and fields, based on which the format configuration data may be generated. In some embodiments, the at least one processor may infer, based on heuristics or statistics, possible or probable format configuration requirements, and notify to suggest the user add those possible or probable format configuration requirements. For example, the user may want to focus on social network based purchasing behavior and specifies via the user device in the format configuration requirements of only accepting web traffic data coming from an interaction between a desktop computing device and an e-commerce website. Based on heuristics or statistics, the at least one processor may suggest adding web traffic data coming from the interaction between the desktop computing device and a social network website where the e-commerce website is advertising on.

At step 504, the at least one processor validates test log data in accordance with the format in a test environment in response to the at least one processor identifying the first status. In some embodiments, the test log data may be stored data used for testing purpose. The test log data may be selected from previously validated log data or generated in accordance with a test log format. In some embodiment, the test environment may be part of system 100 as shown in FIG. 1 for developing and testing purposes. In other words, the testing environment may use part of the computing resources of system 100, which may take test log data as input, validates the test log data, but does not store the validated test log data for actual analysis. For example, the testing environment may be an emulated computing device (e.g., emulated computer 312 or 314) designated or otherwise used for testing purposes.

At step 506, if the at least one processor validates the test log data with an error, the at least one processor generates alert data for indicating a format creation error. In some embodiments, the at least one processor may send the alert data to generate an alert indicating the format creation error to user devices (e.g., user device 112 or user device 114 in FIG. 1) of system 100.

At step 508, if the at least one processor validates the test log data without any error, the at least one processor updates the indicator to indicate a second status. In some embodiments, the second status may be set as a status representing that the format is ready to be used in the production environment. In some embodiments, the second status may include one of: an active status indicative of the format being in use, or a deprecated status indicative of the format being effective but not recommended.

In some embodiments, the first and second statuses may be updated in accordance with stages in developing the format. For example, when the format is newly created, the indicator may be set in a status of "draft" indicating it as to be tested. When the format is under review (e.g., by a data analyst who promotes to create this format), the indicator may be set in a status of "in review" indicating it as under review. If the format does not satisfy the requirements of the data analyst, for example, the format may be updated or recreated, in which case the indicator may be reset to "draft." When the format is approved (e.g., by the data analyst), the indicator may be set in a status of "active" indicating it as usable in a production environment. When the format is outdated and must be used with caution, the indicator may be set in a status of "deprecated." If the format is no longer outdated (e.g., due to change of demands in data analysis), the indicator may be reset in the status of "active again." When the format is no longer used, the indicator may be set in a status of "obsolete." In some embodiments, whenever the status of the indicator changes, the at least one processor (e.g., at least one processor of controller 108) may notify (e.g., by sending an email) users of system 100 (e.g., data analysts), by which the knowledge of the formats may be synchronized.

At step 510, the at least one processor validates the preprocessed log data in accordance with the format in a production environment in response to the at least one processor identifying the second status. Step 510 may be implemented in a similar way to step 404 in process 400. In some embodiment, the production environment may be part of system 100 as shown in FIG. 1 for actual log data collection and validation. In other words, the production environment may use part of the computing resources of system 100, which may take actual log data as input, validates the actual log data, and stores the validated actual log data for actual analysis. For example, the production environment may be an emulated computing device (e.g., emulated computer 312 or 314). In some embodiments, log data in the production environment may be structured into a specific form (e.g., a data warehouse format), and additional data or metadata (e.g., session data) may be generated to assist its usage for analysis.

In some embodiments, to validate the preprocessed log data, the at least one processor may perform the following operations. The at least one processor may determine whether the preprocessed log data has a data portion that is of the predetermined data type, and contents of the data portion meet the predetermined validation condition. If the preprocessed log data has the data portion, the at least one processor may determine the preprocessed log data as validated. Otherwise, the at least one processor may generate alert data for indicating a validation error. In some embodiments, the at least one processor may send the alert data to generate an alert indicating the validation error to user devices (e.g., user device 112 or user device 114 in FIG. 1) of system 100.

In some embodiments, when the log format may include mandatory data fields and optional data fields, the at least one processor may check whether the preprocessed log data has a data portion that is of the data type of the mandatory field, and contents of the data portion meet the validation condition of the mandatory field. If any of the aforementioned condition fails, the at least one processor may determine the log data as not validated.

Figure 6:
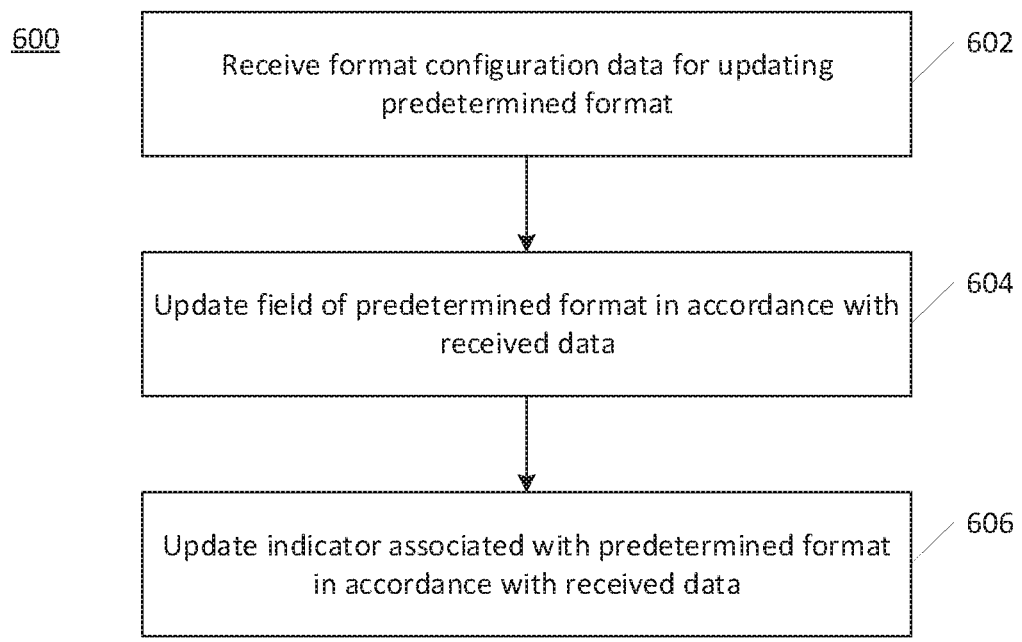
FIG. 6 is a flowchart of an example process for updating a log format, consistent with the disclosed embodiments.

In some embodiments, the at least one processor may be further configured to update the predetermined format. FIG. 6 is a flowchart of an example process 600 for updating the predetermined format, consistent with the disclosed embodiments. Process 600 may be implemented by the at least one processor in process 400, such as any combination of processors 306A-306D. In some embodiments, at least one processor of controller 108 may perform process 600.

At step 602, the at least one processor receives the format configuration data for updating the predetermined format. In some embodiments, the format configuration data may be generated based on parameters received from a user device. For example, the parameters may be input to user device 114 displaying user interface 200 as shown in FIG. 2 by a data analyst.

At step 604, the at least one processor updates a field of the predetermined format in accordance with the received data. For example, the at least one processor may change at least one of an attribute (or a key) or a value corresponding to the attribute of the predetermined format.

At step 606, the at least one processor updates an indicator associated with the predetermined format in accordance with the received data. In some embodiments, the indicator may indicate one of the first status or the second status as described in steps 504 and 510.

Figure 7:
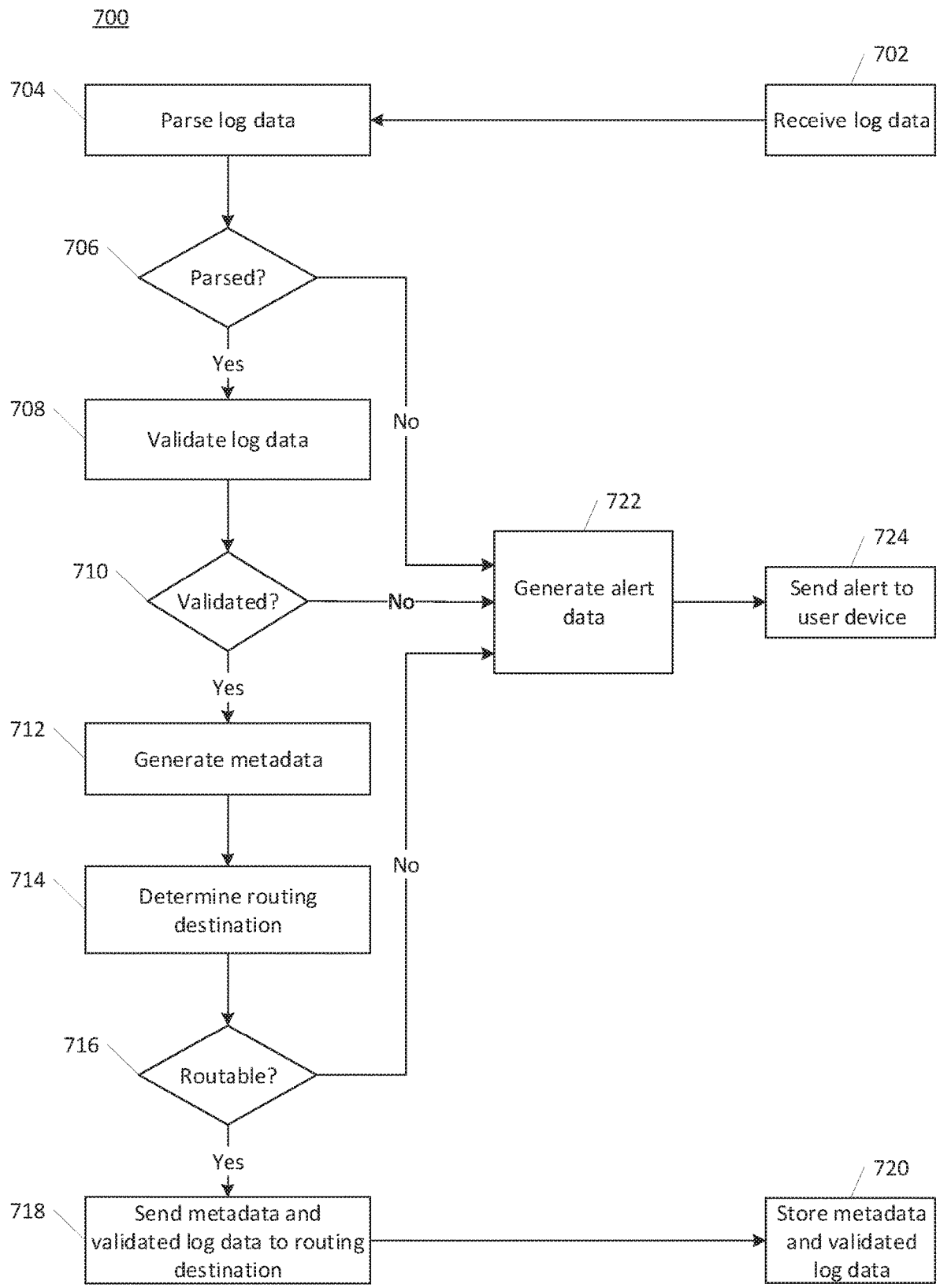
FIG. 7 is a flowchart of an example process for collecting and validating web traffic data, consistent with the disclosed embodiments.

FIG. 7 is a flowchart of an example process 700 for collecting and validating web traffic data, consistent with the disclosed embodiments. Process 700 may be implemented by the at least one processor in process 400, such as any combination of processors 306A-306D. In some embodiments, at least one processor of one or more of log data collector 102, log data streamer 104, log data validator 106, controller 108, or log data storage 110 may perform process 700.

At step 702, the at least one processor receives log data representing an activity of a device (e.g., a computer or a mobile device) interacting with a data service (e.g., a website or a mobile application server). In some embodiments, the log data may be a URI. In some embodiments, at least one processor of log data collector 102 may perform step 702.

At step 704, the at least one processor parses the log data. Step 704 may be implemented as described above with respect to step 402. In some embodiments, the at least one processor may use a text parser to split the log data into portions or pieces for further manipulation. In some embodiments, at least one processor of log data collector 102 may perform step 704.

At step 706, the at least one processor determines whether the parsed log data is in a predetermined data format. Step 706 may be implemented as described above with respect to step 402. In some embodiments, the predetermined data format may structure log data as a key-value (or attribute-value) pair. In some embodiments, the predetermined data format may be a JSON format. In some embodiments, at least one processor of log data streamer 104 may forward the log data received by log data collector 102 to controller 108, at least one processor of which may perform step 706. If the parsed log data is in the predetermined data format, process 700 proceeds to step 708. Otherwise, process 700 proceeds to step 722.

At step 708, the at least one processor validates the preprocessed log data in accordance with a predetermined format. Step 708 may be implemented in a manner similar to step 404 in process 400. In some embodiments, at least one processor of log data validator 106 may perform step 708.

At step 710, the at least one processor determines whether the log data is successfully validated. In some embodiments, at least one processor of log data validator 106 may perform step 710. If the log data is successfully validated, process 700 proceeds to step 712. Otherwise, process 700 proceeds to step 722.

At step 712, the at least one processor generates metadata associated with the validated log data. Step 712 may be implemented in a manner similar to step 406 in process 400. In some embodiments, at least one processor of log data validator 106 may perform step 712.

At step 714, the at least one processor determines a network address (e.g. an IP address) of a routing destination (e.g., log data storage 110) in accordance with a routing rule (e.g., by checking a routing table). Step 714 may be implemented as described above with respect to step 406. In some embodiments, at least one processor of log data streamer 104 may perform step 714.

At step 716, the at least one processor determines whether the network address of the routing destination exists and is routable. In some embodiments, at least one processor of log data streamer 104 may perform step 716. If the network address exists, process 700 proceeds to step 718. Otherwise, process 700 proceeds to step 722.

At step 718, the at least one processor sends the metadata and the validated log data to the routing destination. Step 718 may be implemented as described above with respect to step 406. For example, the at least one processor may send the metadata and the validated log data to the network address of log data storage 110. In some embodiments, at least one processor of log data streamer 104 may perform step 718.

At step 720, the at least one processor stores the metadata and the log data. In some embodiments, at least one processor of log data storage 110 may perform step 720.

At step 722, the at least one processor generates alert data for indicating an error. In some embodiments, when the at least one processor determines that the parsed log data is not in a predetermined data format at step 706, the at least one processor of log data collector 102 may generate the alert data for indicating a parsing error. In some embodiments, when the at least one processor determines that the log data is not validated at step 710, the at least one processor of log data validator 106 may generate the alert data for indicating a validation error. In some embodiments, when the at least one processor determines that the network address of the routing destination does not exist or not routable at step 716, the at least one processor of log data streamer 104 may generate the alert data for indicating a routing error.

At step 724, the at least one processor generates an alert using the alert data and sends it to user devices (e.g., user device 112 or user device 114 in FIG. 1) of system 100, such as by sending an email. Depending on which device generates the alert data, different devices or subsystems may send the alerts. For example, log data collector 102, log data streamer 104, and log data validator 106 may send alerts to user devices indicating the parsing error, the routing error, and the validation error, respectively.

Figure 8:
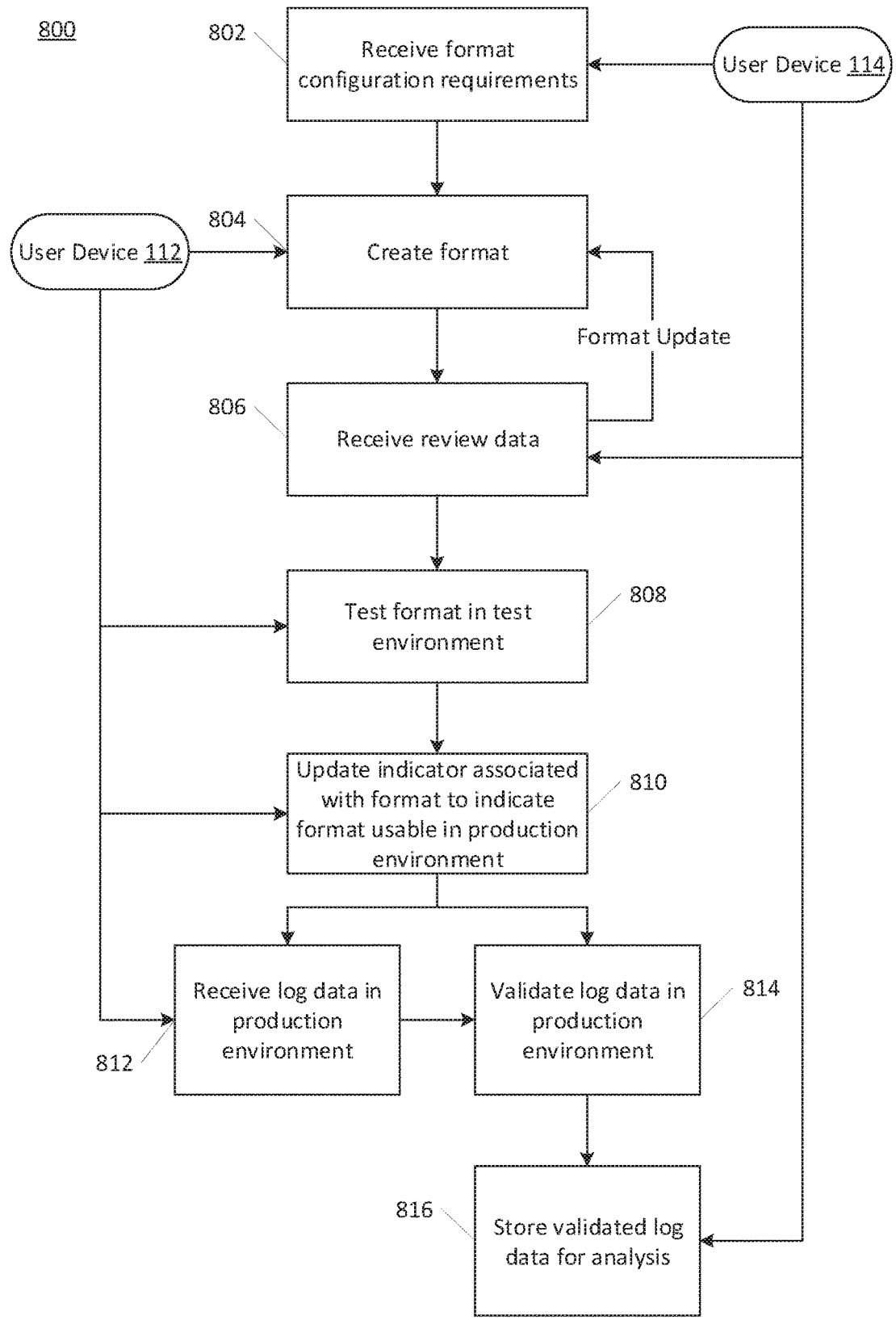
FIG. 8 is a flowchart of an example process for creating, updating, and using a log format for collecting and validating web traffic data, consistent with the disclosed embodiments.

FIG. 8 is a flowchart of an example process for creating, updating, and using a log format for collecting and validating web traffic data, consistent with the disclosed embodiments. Process 800 may be implemented by the at least one processor in process 400, such as any combination of processors 302A-302D. In some embodiments, at least one processor of one or more of log data collector 102, log data streamer 104, log data validator 106, controller 108, or log data storage 110 may perform process 800.

At step 802, the at least one processor receives format configuration requirements for creating a format. In some embodiments, the format may be the log format as described in the specification associated with FIG. 1. The format configuration requirements may be generated using user device 114 by a user (e.g., a log data analyst). For example, the format configuration requirements may be received as a text file that describes target data types and data fields to be used in data analysis. The format configuration requirements may designate mandatory and optional fields. In some embodiments, at least one processor of controller 108 may perform step 802.

At step 804, the at least one processor creates the format based on the received format configuration requirements. In some embodiments, user device 112 may provide an interface to a user (e.g., a log data engineer) to generate format configuration data based on the format configuration requirements, such as using user interface 200 as shown in FIG. 2. Based on the format configuration data, the at least one processor creates the format. In some embodiments, at least one processor of controller 108 may perform step 804.

At step 806, the at least one processor receives review data for the created format. In some embodiments, user device 114 may provide an interface to a user to review the created format to determine whether it conforms to the format configuration requirements and generate the review data. The review data may be, for example, comments, revisions, updated requirements, or any information after reviewing the created format. If a revision is needed, process 800 may go back to step 804, at which the at least one processor updates or recreates the format based on the review data. In some embodiments, at least one processor of controller 108 may perform step 806.

At step 808, the at least one processor validates test log data in accordance with the format in a test environment. Step 808 may be implemented in a manner similar to step 504. In some embodiments, at least one processor of controller 108 may perform step 808. If the test log data is validated with an error, the at least one processor may generate alert data, and process 800 may go back to step 804 for updating or recreating the format.

At step 810, if the at least one processor validates the test log data without any error, the at least one processor updates an indicator associated with the format to indicate that the format is usable in a production environment. In other words, the created format conforms with the format configuration requirements for use. In some embodiments, the at least one processor may update the indicator after receiving an instruction from user device 112. In some embodiments, at least one processor of controller 108 may perform step 810.

At step 812, the at least one processor receives log data in a production environment. In some embodiments, at least one processor of log data collector 102 may perform step 812. In some embodiments, a user device (e.g., user device 112 or user device 114) may provide an interface to a user to use the SDK to deserialize, validate, or measure the incoming log data to be received by the log data collector 102. In some embodiments, the SDK may provide an interface to use specifications (e.g., the log format) provided by controller 108 to deserialize, validate, or measure the incoming log data. In some embodiments, the at least one processor may preprocess the log data, such as by parsing the log data and determining whether the parsed log data is in the created format.

At step 814, the at least one processor validates the received log data in accordance with the created format in the production environment. Step 814 may be implemented in a manner similar to step 404. In some embodiments, at least one processor of log data validator 106 may perform step 814.

At step 816, the at least one processor stores the validated log data for future analysis. In some embodiments, the at least one processor may store the validated log data in log data storage 110. In some embodiments, at least one processor of log data storage 110 may perform step 816. In some embodiments, user device 114 may provide an interface to a user to retrieve the validated log data from log data storage 110 to perform the analysis.

In some embodiments, in process 800, user devices of system 100 (e.g., user device 112 and user device 114) may provide means (e.g., joining an email list) for users to subscribe to notifications of the created format to receive updates of development of a format. For example, user device 112 may receive a notification (e.g., an email) when the at least one processor receives the format configuration requirements from user device 114. User device 114 may receive a notification when the format is created in accordance with the format configuration requirements, and start the reviewing. User device 112 may receive a notification when user device 114 finishes the reviewing and the at least one processor receives the review data, and decide to update the created format or proceed to test. When the format passes testing and become useable in the production environment, all user devices of system 100 may receive notifications, after which they may list, view, and search the newly available format.

While the present disclosure has been shown and described with reference to particular embodiments thereof, it will be understood that the present disclosure may be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects may also be stored on other types of computer-readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules may be created using any of the techniques known to one skilled in the art or may be designed in connection with existing software. For example, program sections or program modules may be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for collecting and validating web traffic data, comprising:

a memory storing instructions; and at least one processor configured to execute the instructions to:

in response to receiving format configuration data for creating a validation format, create the validation format associated with an indicator indicative of a first status, the validation format comprising a first field indicative of a predetermined data type and a second field indicative of a predetermined validation condition associated with the predetermined data type;

in response to identifying the first status, validate test log data in accordance with the validation format in a test environment;

based on a determination that an error is identified in validating the test log data, generate alert data for indicating a format creation error;

based on a determination that no error is identified in validating the test log data, update the indicator to indicate a second status;

receive log data representing an activity of a device interacting with a data service;

preprocess the log data by parsing the log data and determining whether the parsed log data is in the validation format;

based on a determination that the parsed log data is not in the validation format, generate alert data for indicating a preprocessing error;

based on a determination that the parsed log data is in the validation format, validate the preprocessed log data in accordance with the validation format in response to identifying the second status;

generate metadata associated with the validated preprocessed log data;

send the metadata and the validated preprocessed log data to a storage device;

determine whether a network address of a storage device exists in accordance with a routing rule;

based on a determination that the network address exists, send the metadata and the validated preprocessed log data to the network address; and based on a determination that the network address does not exist, generate alert data indicating a routing error and send the alert data to one or more user devices, wherein the alert data causes generation of an alert indicating the routing error.

2. The system of claim 1, wherein the at least one processor is further configured to update a predetermined format in accordance with the format configuration data, by executing the instructions to:
receive the format configuration data for updating the predetermined format;
update a field of the predetermined format in accordance with the received data; and
update an indicator associated with the predetermined format in accordance with the received data, wherein the indicator indicates one of the first status or the second status.

3. The system of claim 1, wherein the at least one processor is further configured to execute the instructions to:
determine whether the log data has a data portion, wherein the data portion is of a predetermined data type and contents of the data portion meet a predetermined validation condition associated with the predetermined data type;
based on a determination that the log data has the data portion, determine the log data as validated; and
based on a determination that the log data does not have the data portion, generate alert data for indicating a validation error.

4. The system of claim 1, wherein:
the first status comprises one of a draft status indicative of a new created format, a review status indicative of the created format being under review, or an obsolete status indicative of the format being ineffective; and
the second status comprises one of an active status indicative of the format being in use or a deprecated status indicative of the format being effective but not recommended.

5. The system of claim 1, wherein:
the log data is validated in accordance with a predetermined format, the predetermined format comprising a field indicative of a predetermined data type and a field indicative of a predetermined validation condition associated with the predetermined data type, the predetermined format comprising at least one of a mandatory field or an optional field;
the predetermined validation condition associated with the mandatory field requires the log data to include a data portion of a type indicated by the mandatory field; and
the predetermined validation condition associated with the optional field does not require the log data to include a data portion of a type indicated by the optional field.

6. The system of claim 1, wherein:
the log data is validated in accordance with a predetermined format, the predetermined format comprising a field indicative of a predetermined data type and a field indicative of a predetermined validation condition associated with the predetermined data type; and
the predetermined validation condition associated with the predetermined data type is associated with an activity of an individual interacting with the data service using the device.

7. The system of claim 1, wherein:
the log data is validated in accordance with a predetermined format, the predetermined format comprising a field indicative of a predetermined data type and a field indicative of a predetermined validation condition associated with the predetermined data type;
the predetermined data type comprises at least one of a character string type, an integer type, a real number type, or a Boolean type; and
the predetermined validation condition associated with the predetermined data type comprises at least one of: a data portion having no non-character value when the data portion is of the character string type, the data portion having no non-integer value when the data portion is of the integer type, the data portion having no non-numeric value when the data portion is of the real number type, or the data portion having no non-Boolean value when the data portion is of the Boolean type.

8. The system of claim 1, wherein:
the log data is validated in accordance with a predetermined format, the predetermined format comprising a field indicative of a predetermined data type and a field indicative of a predetermined validation condition associated with the predetermined data type;
the data service comprises at least one of a website or a mobile application server;
the log data comprises a uniform resource identifier of the data service; and
the predetermined format comprises a JavaScript object notation (JSON) format.

9. A computer-implemented method for collecting and validating web traffic data, comprising:
in response to receiving format configuration data for creating a validation format, creating the validation format associated with an indicator indicative of a first status, the validation format comprising a first field indicative of a predetermined data type and a second field indicative of a predetermined validation condition associated with the predetermined data type;
in response to identifying the first status, validating test log data in accordance with the validation format in a test environment;
based on a determination that an error is identified in validating the test log data, generating alert data for indicating a format creation error;
based on a determination that no error is identified in validating the test log data, updating the indicator to indicate a second status;
receiving log data representing an activity of a device interacting with a data service;
preprocessing the log data by parsing the log data and determining whether the parsed log data is in the validation format;
based on a determination that the parsed log data is not in the validation format, generating alert data for indicating a preprocessing error;
based on a determination that the parsed log data is in the validation format, validating the preprocessed log data in accordance with the validation format in response to identifying the second status;
generating metadata associated with the validated preprocessed log data;
sending the metadata and the validated preprocessed log data to a storage device;
determining whether a network address of a storage device exists in accordance with a routing rule;
based on a determination that the network address exists, sending the metadata and the validated preprocessed log data to the network address; and based on a determination that the network address does not exist, generating alert data indicating a routing error and send the alert data to one or more user devices, wherein the alert data causes generation of an alert indicating the routing error.

10. The computer-implemented method of claim 9, wherein validating comprises validating the log data in accordance with a predetermined format, wherein the predetermined format is updated by:
    receiving the format configuration data for updating the predetermined format;
    updating a field of the predetermined format in accordance with the received data; and
    updating an indicator associated with the predetermined format in accordance with the received data, wherein the indicator indicates one of the first status or the second status.

11. The computer-implemented method of claim 9, wherein validating comprises validating the log data in accordance with a predetermined format, the validating further comprising:
    determining whether the log data has a data portion, wherein the data portion is of a predetermined data type and contents of the data portion meet a predetermined validation condition associated with the predetermined data type;
    based on a determination that the log data has the data portion, determining the log data as validated; and
    based on a determination that the log data does not have the data portion, generating alert data for indicating a validation error.

12. The computer-implemented method of claim 9, wherein validating comprises validating the log data in accordance with a predetermined format, the predetermined format comprising a field indicative of a predetermined data type and a field indicative of a predetermined validation condition associated with the predetermined data type, wherein the predetermined format comprises at least one of a mandatory field or an optional field;
    the predetermined validation condition associated with the mandatory field requires the log data to include a data portion of a type indicated by the mandatory field; and
    the predetermined validation condition associated with the optional field does not require the log data to include a data portion of a type indicated by the optional field.

13. A system for collecting and validating web traffic data, comprising:
    a memory storing instructions; and
    at least one processor configured to execute the instructions to:
        in response to receiving format configuration data for creating a validation format, create the validation format associated with an indicator indicative of a first status, the validation format comprising a field indicative of a predetermined data type and a field indicative of a predetermined validation condition associated with the predetermined data type;
        in response to identifying the first status, validate test log data in accordance with the validation format in a test environment;
        based on a determination that an error is identified in validating the test log data, generate alert data for indicating a format creation error;
        based on a determination that no error is identified in validating the test log data, update the indicator to indicate a second status;
        receive log data representing an activity of a device interacting with a data service in a production environment;
        preprocess the log data by parsing the log data and determining whether the parsed log data is in the validation format;
        based on a determination that the parsed log data is not in the validation format, generate alert data for indicating a preprocessing error;
        based on a determination that the parsed log data is in the validation format, validate the preprocessed log data in accordance with the validation format in response to identifying the second status;
        generate metadata associated with the validated preprocessed log data;
        send the metadata and the validated preprocessed log data to a storage device;
        determine whether a network address of the storage device exists in accordance with a routing rule;
        based on a determination that the network address exists, send the metadata and the validated preprocessed log data to the network address; and
        based on a determination that the network address does not exist, generate alert data indicating a routing error and send the alert data to one or more user devices, wherein the alert data causes generation of an alert indicating the routing error.

* * * * *